United States Patent Office 3,084,948
Patented Apr. 9, 1963

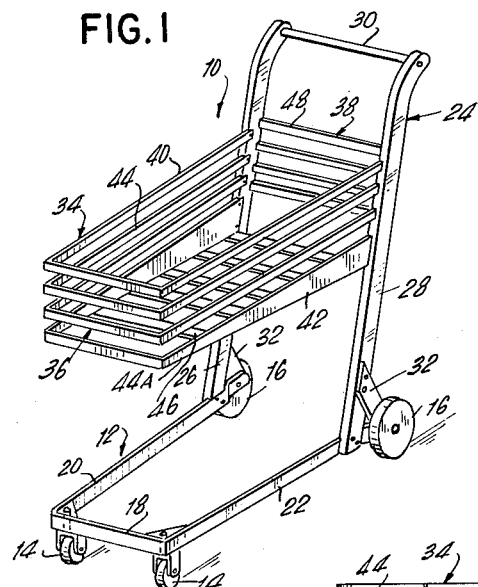
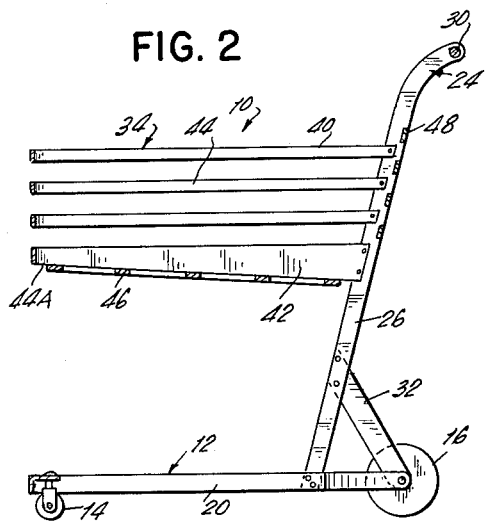
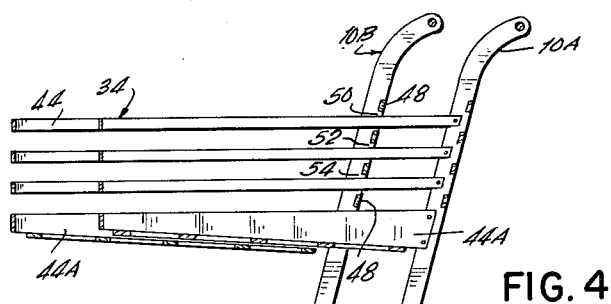
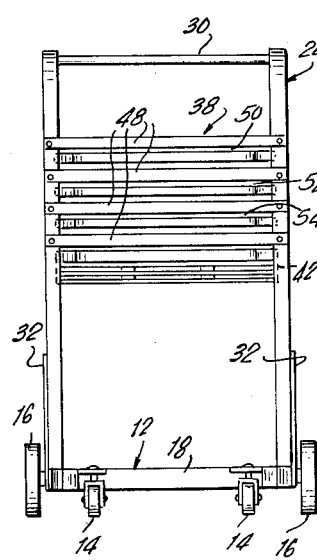

3,084,948
SHOPPING CART
Abraham Friedman, 26 Court St., Brooklyn 1, N.Y.
Filed Dec. 12, 1961, Ser. No. 158,856
4 Claims. (Cl. 280—33.99)

The present invention relates in general to shopping carts and, in particular, to the types of shopping carts which are provided in a supermarket or the like for the use of customers.

The modern supermarket caters to a great number of customers each day and it is necessary to provide each customer while he is on the premises with a shopping cart which he can use to assemble his purchases and then take the purchases to a checkout cashier. The necessity for stocking a large number of shopping carts results in a storage problem of major proportions. Heretofore, it has been suggested in the prior art to provide each shopping cart with a basket having a hinged rear wall whereby it is possible to nest the shopping carts within each other by moving one cart against the rear hinged wall of another cart so as to swing the wall open and permit the entry of the front portion of the basket of a rear cart into the rear portion of the basket of a cart disposed forwardly thereof. The necessity of providing a hinged rear basket wall on each shopping cart results in an increased cost therefor. In addition, the swinging rear wall of the basket presents a hazard especially since children are fond of moving the rear wall forward upon its hinges with the consequent possibility of having their fingers caught or wedged by the hinged wall as it returns to its normal rest position.

In view of the foregoing, it is an object of the present invention to provide a shopping cart which obviates all of the disadvantages and objections inherent in the construction of the prior art shopping carts.

It is another object of the present invention to provide a shopping cart construction which permits for the nesting of a plurality of shopping carts without however requiring each shopping cart to be provided with a basket portion having a hinged or swingable rear wall.

It is another object of the present invention to provide a shopping cart having a basket which is provided with a stationary rear wall and which, nevertheless, will permit for the nesting of a similar shopping cart therein.

It is a further object of the present invention to provide a highly novel and efficient shopping cart construction which will permit for the ready nesting of a plurality of similar shopping carts which can be manufactured and sold at a relatively low price and which do not present the hazards inherent in a shopping cart provided with a swingable rear wall.

Other and further objects and advantages of the present invention will be readily apparent to one skilled in the art from a consideration of the following specification taken in connection with the appended drawings.

In the drawings, which illustrate the best mode presently contemplated for carrying out the invention:

FIGURE 1 is a perspective view of a shopping cart pursuant to the present invention;

FIGURE 2 is a side elevation view of the shopping cart;

FIGURE 3 is a rear elevation view of the shopping cart;

FIGURE 4 is a side elevation view showing a pair of shopping carts in nested relation for purposes of storage, portions being broken away for purposes of illustration; and FIGURE 5 is a top plan view of FIGURE 4.

Referring now to the drawings in detail, there is shown a shopping cart 10 pursuant to the present invention.

The shopping cart is fabricated of a preferably suitable metallic material and as here shown, is provided with a base 12 which is in the form of a frame which is open at the rear thereof. At the forward end thereof, the frame mounts a pair of casters 14 and at the rear thereof mounts a pair of wheels 16. As here shown, the frame is constituted by a forward or front horizontal wall 18 and with a pair of opposing side walls 20—22 which diverge outwardly from the front wall 18 and mount the wheels 16 at the rear end thereof, as best shown, for example, in FIGURE 3.

An inverted U-shaped member 24 extends upwardly from the frame 12. More specifically, the U-shaped member 24 is provided with a pair of legs 26 and 28 which are interconnected by a bight 30 which constitutes a handle for the shopping cart 10. The free ends of the legs 26 and 28 are suitably secured as by welding or the like to the inner surfaces of the frame arms or side walls 20 and 22 respectively adjacent the free ends of the latter. A pair of struts or supports 32 extend from the legs 26 and 28 to the free end of the associated side wall of the frame.

The inverted U-shaped member 24 mounts a basket 34 between the handle portion 30 and the free ends of the legs thereof. The basket 34 is of general trapezoidal conformation, being provided with a front wall 36 and a rear wall 38 which are in parallel relation, the rear wall 38 being wider than the front wall 36 so that the side walls 40 and 42 of the basket converge from the rear wall toward the front wall. As here shown, the front and side walls of the basket are constituted by a plurality of U-shaped preferably metallic members which are mounted in spaced superposed relation by the legs 26 and 28 of the U-shaped member 24. More specifically, the free ends of each U-shaped basket member 44 are suitably secured as by welding, bolting or the like to the legs 26 and 28. The lowermost U-shaped basket member 44A differs from the other basket members in that the legs thereof are widest at the point of securement thereof to the legs 26 and 28 respectively of the U-shaped member 24 and taper so as to narrow toward the front wall 36 of the basket. This provides added strength and support for the basket. The top of the basket is open and the bottom of the basket is closed by a plurality of horizontal struts 46 which interconnect the sides of the lowermost basket member 44A and form an inclined bottom therefor.

Pursuant to the present invention, the rear wall 38 of the basket 34 is not a swingable or hinged rear wall as in the prior art. The rear wall 38, pursuant to the present invention, is a fixed or immovable rear wall which is constituted by a plurality of vertically spaced struts or spars 48 which extend between the legs 26 and 28 of the U-shaped member 24 and are fixedly secured thereto at the ends of the struts. The struts 48 which constitute the rear wall 38 may be secured in any suitable fashion to the legs 26 and 28. Pursuant to the present invention, the transverse struts 48 are vertically offset relative to the horizontal U-shaped basket members 44. More specifically and as best shown in FIGURE 4, each basket 34 as here shown is constituted by four horizontal superposed U-shaped basket members 44. A strut 48 is associated with each basket member 44 so that in the present embodiment, since there are four U-shaped basket members 44, there are also provided four horizontal struts 48 extending between the companion legs 26 and 28 of the U-shaped member 24. However, each horizontal strut 48 is spaced or offset upwardly from its associated U-shaped basket member 44, so as to define spaces therebetween. More specifically, it will be noted that a space 50 is defined between the two uppermost struts 48, a space 52 is defined between the second and third struts, and a space 54 is defined between the third and the fourth struts, said spaces being substantially on the same horizontal level or within the same plane as the three upper basket members 44. Consequently, since the spaces 50, 52 and 54 are in the same plane as each of the three uppermost basket members, they can readily receive and permit the passage therethrough of the upper three basket members of another basket 34, as best shown in FIGURE 4, when it is desired to nest a pair of the shopping carts 10. In this connection, it will be noted, as previously indicated, that the lowermost strut or spar 48 is disposed upwardly of the lowermost basket member 44A and since there is no obstruction below the lowermost strut 48, the lowermost basket member 44A of the shopping cart which is being nested is free to move through the rear wall 38 in the same manner as the upper basket members, as best shown in FIGURE 4. As previously indicated, the baskets 34 are of general trapezoidal conformation with the front wall 36 thereof being narrower than the rear wall 38 thereof. Consequently, a rear basket or shopping cart 10A may be readily nested within a front shopping cart 10B, as shown in FIGURE 4, with the basket 34 of the rear shopping cart being nested within the basket 34 of the front shopping cart, due to the fact that the struts or ribs 48, which constitute the rear wall of the front basket member, are upwardly spaced from each of the associated U-shaped basket members of the front basket. Moreover, as previously indicated, the base frame 12 of each of the basket members is also of trapezoidal conformation and the rear thereof is open, so that the frame 12 of the rear basket member or rear shopping cart 10A may be readily inserted within the frame of the front shopping cart 10B.

In view of the foregoing, it will be apparent that there has been described a construction for a shopping cart which eliminates the necessity for providing a swingable rear wall for the basket thereon and yet which will permit the nesting of a plurality of shopping carts for storage purposes.

While I have illustrated and described the presently preferred embodiment of my invention, it will be apparent that changes and modifications may be made therein without however departing from the spirit and scope of the invention as set forth in the appended claims.

I claim:
1. A shopping cart comprising a three-sided wheeled base of trapezoidal conformation, an inverted U-shaped member having its free ends secured adjacent to the free ends of said base, and trapezoidal basket means provided on the legs of said U-shaped member and extending forwardly therefrom to overlie said base, said basket means comprising a plurality of superposed horizontally disposed U-shaped basket members having their free ends secured to said legs, and a fixed rear wall for said basket means comprising a similar plurality of transverse members extending between said legs, each transverse member being offset upwardly from its associated basket member so as to provide horizontal openings in said rear wall in the horizontal planes of said basket members.

2. A shopping cart as in claim 1, the lowermost basket member having opposing sides which taper from said legs to the front of the basket.

3. A shopping cart as in claim 1, and means provided on the lowermost basket member to provide a bottom wall for the basket.

4. A shopping cart comprising a nestable wheeled base, basket means supported by said wheeled base, said basket means including a front wall and side walls comprising a plurality of generally U-shaped horizontal members disposed in spaced superposed relation and a rear wall comprising a plurality of horizontally disposed transverse members extending transversely of the open ends of said U-shaped members and disposed in spaced superposed relation, said side walls being convergent in the direction of said front wall, said transverse members being vertically offset with respect to said U-shaped members so as to provide spaced horizontal openings in said rear wall to permit the passage of the U-shaped members of a similar basket means therethrough whereby similar baskets may be nested with each other.

References Cited in the file of this patent
UNITED STATES PATENTS

| | | |
|---|---|---|
| 2,639,161 | Goldman | May 19, 1953 |
| 2,738,201 | Spears | Mar. 13, 1956 |
| 2,818,267 | Watson | Dec. 31, 1957 |
| 2,879,886 | Crane | Mar. 31, 1959 |